United States Patent [19]

Vorres

[11] 4,369,045
[45] Jan. 18, 1983

[54] FLUIDIZED BED GASIFICATION PROCESS WITH AGGLOMERATED SOLIDS REMOVAL

[75] Inventor: Karl S. Vorres, Western Springs, Ill.

[73] Assignee: Institute of Gas Technology, Chicago, Ill.

[21] Appl. No.: 288,158

[22] Filed: Jul. 29, 1981

[51] Int. Cl.³ ............................................. C10J 3/54
[52] U.S. Cl. ................................. 48/197 R; 48/203; 48/206; 48/210; 34/10
[58] Field of Search ............... 48/197 R, 202, 203, 48/206, 210; 202/373; 422/145; 34/10, 57 A

[56] References Cited

U.S. PATENT DOCUMENTS

| | | |
|---|---|---|
| 666,033 | 1/1901 | Slocum . |
| 746,452 | 12/1903 | Brush . |
| 2,017,043 | 10/1935 | Galliot ................... 138/40 |
| 2,689,787 | 9/1954 | Ogorzaly et al. ............ 48/197 |
| 2,709,675 | 5/1955 | Phinney ................... 202/23 |
| 2,725,347 | 11/1955 | Leffer ..................... 202/6 |
| 2,782,109 | 2/1957 | Roberts ................... 48/206 |
| 2,856,264 | 10/1958 | Dunn ...................... 34/57 A |
| 2,906,608 | 9/1959 | Jequier et al. ............ 48/206 |
| 3,322,521 | 5/1967 | Cockerham ................. 48/63 |
| 3,636,983 | 1/1972 | Keyser .................... 138/39 |
| 3,693,329 | 9/1972 | Willis .................... 55/457 |
| 3,932,146 | 1/1976 | Wilson et al. ............. 48/210 |
| 3,935,825 | 2/1976 | Matthews et al. ........... 110/165 R |
| 3,937,620 | 2/1976 | Rudolph et al. ............ 48/63 |
| 3,985,519 | 10/1976 | Kalina et al. ............. 48/202 |
| 4,022,591 | 5/1977 | Staudinger ................ 48/76 |
| 4,023,280 | 5/1977 | Schora et al. ............. 34/10 |
| 4,035,152 | 7/1977 | Yang et al. ............... 201/31 |
| 4,057,402 | 11/1977 | Patel et al. .............. 48/197 R |
| 4,088,455 | 5/1978 | Kohlen et al. ............. 48/202 |
| 4,106,999 | 8/1978 | Koppelman et al. .......... 202/118 |
| 4,135,889 | 1/1979 | Mori ...................... 48/73 |
| 4,135,982 | 1/1979 | Green ..................... 201/12 |
| 4,146,369 | 3/1979 | Flesch et al. ............. 48/201 |
| 4,146,370 | 3/1979 | van Herwijnen et al. ...... 48/210 |

*Primary Examiner*—Peter F. Kratz
*Attorney, Agent, or Firm*—Allegretti, Newitt, Witcoff & McAndrews, Ltd.

[57] ABSTRACT

A process for withdrawing agglomerated solids, e.g. ash, from a fluidized bed of finely divided solid hydrocarbonaceous material, e.g. coal, is described. Agglomeration is effected by a high temperature reaction between the inorganic constituents of the hydrocarbonaceous material in the fluidized bed environment. A venturi is utilized to serve as a passage for withdrawing the agglomerated solids from the fluidized bed. Spiral or other descending ridges are positioned on the interior surface of the constricted cylindrical opening of the venturi to permit variable and increased rates of agglomerate discharge with improved separation and classification of the solid materials.

9 Claims, 7 Drawing Figures

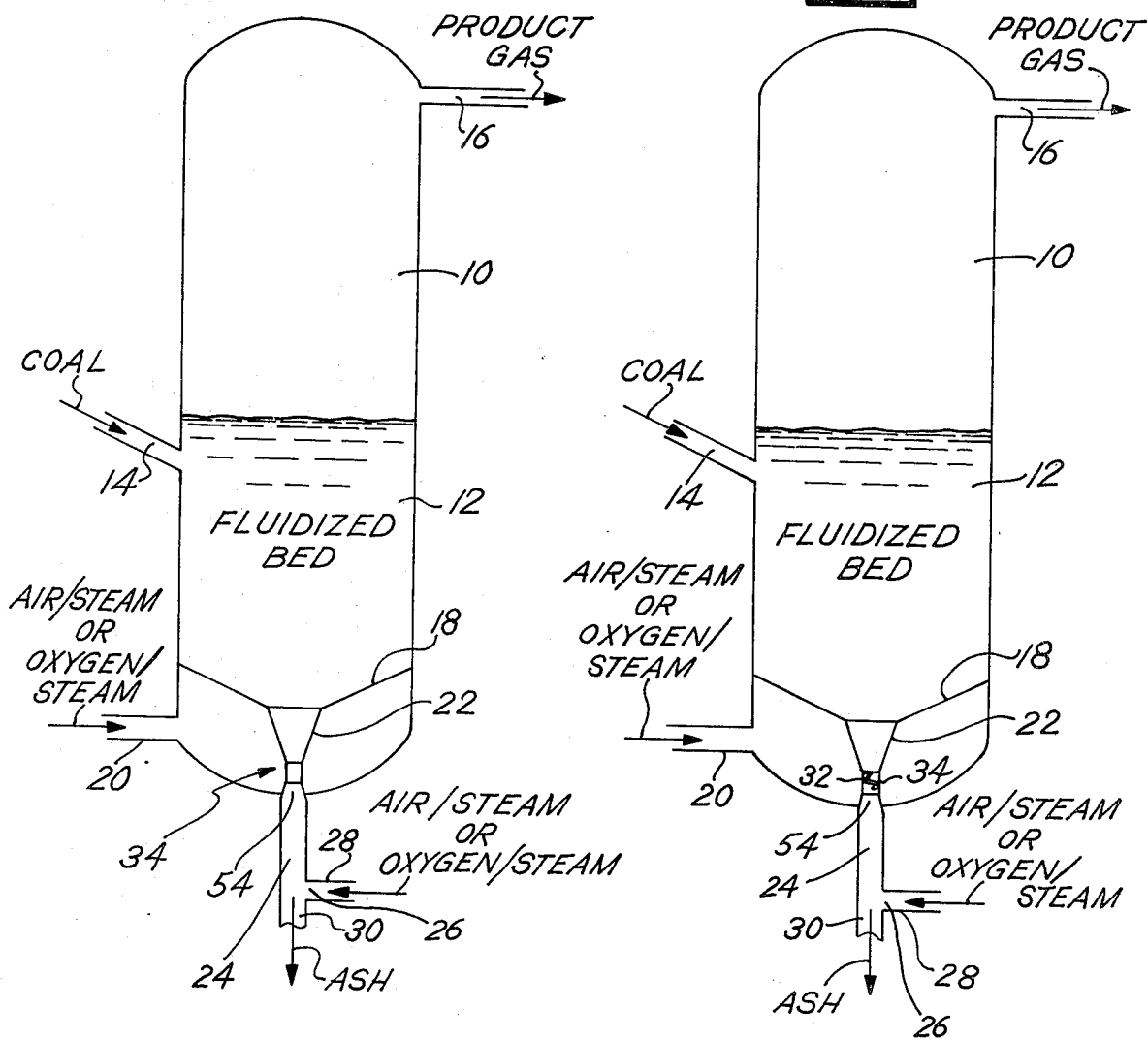
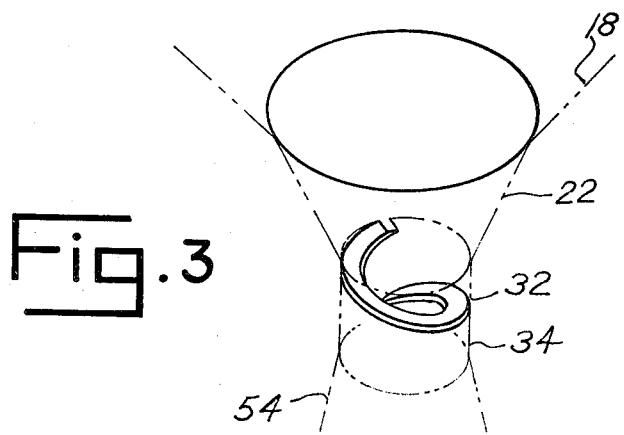

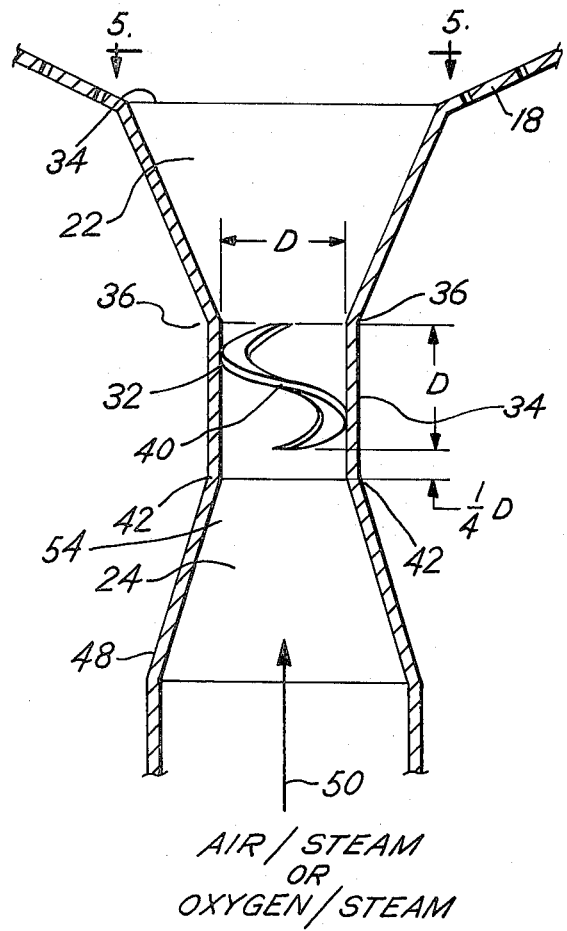
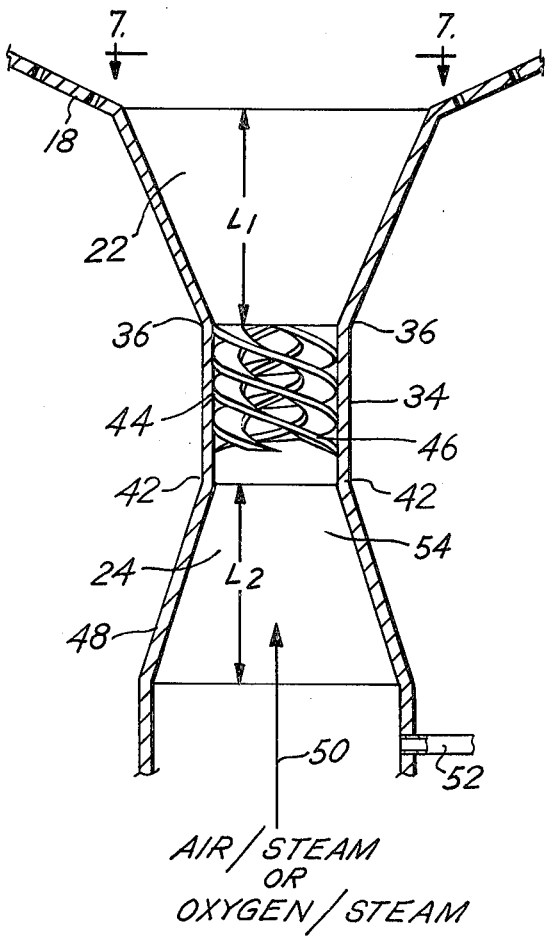
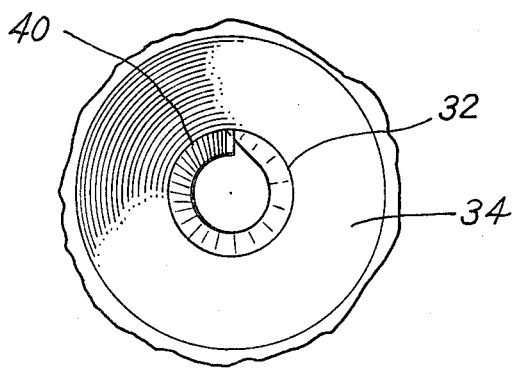
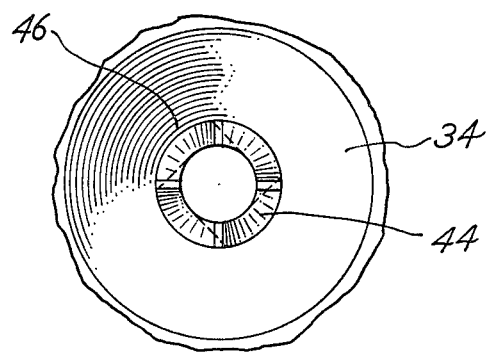

FLUIDIZED BED GASIFICATION PROCESS WITH AGGLOMERATED SOLIDS REMOVAL

BACKGROUND OF THE INVENTION

This invention relates to an improved apparatus and process for withdrawing agglomerated solids from a fluidized bed of finely divided solid hydrocarbonaceous material and more particularly, to an apparatus and process wherein the agglomeration is effected by a high temperature reaction between the inorganic constituents of the hydrocarbonaceous material in the fluidized bed environment.

A coal gasification reactor wherein agglomerated coal ash is withdrawn from a fluidized reaction bed of finely divided coal without the removal of the finely divided coal particles is described in Jequier et al, U.S. Pat. No. 2,906,608, the teachings of which are incorporated by reference herein. In a coal to gas conversion process of the type described in Jequier et al, a vessel is provided to contain a fluidized bed. A gas distribution grid is usually positioned in the bottom of the vessel to define the bottom surface of the fluidized bed. The central portion of the grid may be conical or cylindrical in shape and comprises a downwardly extending passage. At the bottom of the passage, a constriction is provided having an opening defining a venturi of fixed throat size to guide the gas passing into the vessel upwards into the fluidized bed. A stream of high velocity gas is directed through the venturi or passage into the reaction vessel, causing ash particles to agglomerate in the bottom portion of the vessel and eventually discharge downwardly through the passage and venturi throat.

In Jequier et al, at column 3, lines 7-10, it is taught that "[i]t is desirable that the gasification agents should have a speed perpendicular to the smallest section of the venturi and at this point they should not have any helicoidal movement." It has been discovered that a direct upward passage of fluid through the venturi does not provide the most efficient rate of solid discharge through the venturi. Improved solids discharge or removal can be obtained through provision of ridges or other devices to permit the descent of agglomerated ash.

In Schora et al, U.S. Pat. No. 4,023,280 and Patel et al, U.S. Pat. No. 4,057,402, the environment in which the claimed invention could operate as well as some of the problems associated with a classifier for a fluidized bed ash agglomerating gasifier are also described. With respect to Schora et al, an apparatus and method for varying the cross-sectional area of the venturi input in a fluidized bed retained within a vessel are disclosed. With respect to Patel et al, a process for gasifying carbonaceous feed materials is disclosed. Both patents utilize a venturi which has a smooth internal surface which provides for a combination of agglomerate release but at undesirably low agglomerate flow rates and evidencing incomplete separation of ash from unreacted hydrocarbonaceous material, such as char.

Keyser, U.S. Pat. No. 3,636,983, Wilis, U.S. Pat. No. 3,693,329 and Galliot, U.S. Pat. No. 2,017,043, describe fluid flow arrangements in hollow pipes in which a spiral angular velocity is imparted to the fluid by the use of ridges disposed within a pipe. None of the Keyser, Willis or Galliot patents contemplates the passage and agglomeration of particulate matter, such as agglomerated ash, falling by force of gravity countercurrent to a high temperature gas flow, nor the problems associated with ash agglomeration as encountered by applicant.

A problem associated with the apparatus as illustrated in Jequier et al is that extremely high temperatures are present in the defined conical withdrawal section. In addition, since the abrasive agglomerated ash particles are in constant physical contact with the walls of the cone and because of the high temperatures present therein, expensive alloys are required to manufacture a long lasting withdrawal cone. More importantly, since the gas stream that surrounds the ash agglomerates is the same as the stream separating or classifying the agglomerates from the fluidized bed, unusual restrictions are imposed on the rate and composition of gas flow. In addition to undesirable sintering taking place in the venturi, the nozzle can plug, particularly when fine coal material, as recovered from product gases, is recycled back to the fluidized bed through the venturi nozzle. Because the plugging occurs in a confined zone of high temperature, a fused adherent mass, if it forms, can lead to an undesired premature reactor shutdown. Problems such as these have created a need for modifications in the classification apparatus.

The use of any interior ridges, spiral or otherwise, in a fluidized bed gasifier venturi to facilitate ash agglomeration and selective solids withdrawal has not been disclosed in any of the prior art. The smooth bore venturi orifices used in the past have relatively low rates of solid discharge from fluidized bed gasifiers and incomplete separation and classification of ash from unreacted solid hydrocarbonaceous material, such as char. It is with this background that the present invention was developed.

SUMMARY OF THE INVENTION

It is an object of the present invention to provide an improved apparatus and process for withdrawing agglomerated solids from a fluidized bed of particulate hydrocarbonaceous material.

Another object of the present invention is to provide an improved apparatus and process for withdrawing reaction products, which are more dense than the reactants, from a fluidized bed of solid hydrocarbonaceous particles.

A further object of the present invention is to provide an apparatus and process for increasing the rate of discharge of agglomerated solid material and better controlling the discharge thereof.

Still another object of the present invention is to provide an apparatus and process for improving the separation of agglomerated solids, such as ash, from the unreacted solid hydrocarbonaceous material, such as coal char in a venturi device.

It is yet another object of the present invention to provide an apparatus and process for improving the method of contacting solids and gases in a reactor, such as a fluidized bed gasifier for classification of the solid materials.

It is a further object of the present invention to provide an apparatus and process for permitting the selective return of solids to the fluidized bed or similar reactor while, at the same time, permitting efficient withdrawal of solids.

In a principal aspect, the present invention relates to an apparatus and process for withdrawing agglomerated solids from a fluidized bed of particulate hydrocarbonaceous material. An apparatus is utilized which comprises a vessel adapted to contain the fluidized bed and a passage positioned at the bottom of the vessel for withdrawal of agglomerated solids from the fluidized bed. The passage comprises a venturi having a constricted cylindrical opening and an upward extending conical portion wherein the agglomerated solids are formed as a result of a high temperature reaction involving the hydrocarbonaceous material and an upwardly passing gas stream. The venturi has at least on spiral ridge positioned on the interior surface of the constricted cylindrical opening to permit efficient withdrawal of the agglomerated solids. In this manner, it is possible to have variable or increased rates of agglomerate discharge from the fluidized bed thereby having improved discharge control.

In another principal aspect, the present invention relates to a process for the conversion of particulate hydrocarbonaceous material, such as coal, to valuable combustible gaseous components in a fluidized bed and withdrawing agglomerated solids from the bottom of the fluidized bed. The solid hydrocarbonaceous material is passed into the fluidized bed where it is contacted with an upward flowing gaseous medium at conditions, well known to one having ordinary skill in the art, sufficient to form gaseous fuel components by a gasification reaction between the solids and the gas. A high velocity gas stream is passed upward into the bottom of the fluidized bed through a passage comprising a venturi which has an upwardly extending conical portion and a central constricted cylindrical opening. The gas contacts and reacts with the carbonaceous solids in the bottom of the fluidized bed at conditions, well known to one skilled in the art, to form particles with a sticky ash material on at least part of the surface. These particles collide to form agglomerated solids. The agglomerated solids which form, and have a high ash content, are withdrawn through the cylindrical opening which has at least one spiral ridge positioned on its interior surface. In this manner, it is possible to facilitate the improved separation of agglomerated high ash solids from the unreacted solid hydrocarbonaceous material.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a schematic diagram of a typical fluidized bed gasifier incorporating an ash agglomerating device;

FIG. 2 is a schematic diagram of a typical fluidized bed gasifier incorporating the improved venturi of the present invention with one spiral ridge positioned on the interior surface of the constricted cylindrical opening of the venturi.

FIG. 3 is a schematic diagram of the improved venturi of the present invention with one spiral ridge positioned on the interior surface of the constricted cylindrical opening of the venturi.

FIG. 4 is a partial cross-sectional view of FIG. 2 showing the improved venturi of the present invention with one spiral ridge positioned on the interior surface of the constricted cylindrical opening of the venturi;

FIG. 5 is a partial cross-sectional view of FIG. 3 showing one spiral ridge positioned on the interior surface of the constricted cylindrical opening of the venturi.

FIG. 6 is a cross-sectional view of a preferred improved venturi in accordance with the present invention.

FIG. 7 is a cross-sectional view of four spiral ridges positioned on the interior surface of the constricted cylindrical opening of the venturi.

DETAILED DESCRIPTION OF THE PREFERRED EMBODIMENT

FIG. 1 is a schematic drawing of a prior art fluidized bed gasifying apparatus or device which includes conventional means for agglomerating ash or particulate matter in the fluidized bed as generally described in Jequier et al., U.S. Pat. No. 2,906,608, previously referenced. Briefly, the device includes an upright vessel 10 within which a fluidized bed 12 of coal char is retained at conventional temperature and pressures for the conversion of the coal to gaseous products. Specifically, pulverized fresh feed coal enters via line 14 and is contained within the bottom portion of the vessel or reactor 10 as a fluid bed 12. The coal within the bed 10 is then converted by reaction with steam and air or oxygen to gaseous fuel components. These gaseous fuel components pass from the vessel 10 through a discharge line 16.

A shaped sloped grid 18 is provided within the vessel 10 at the bottom of the bed 12. Air or oxygen and steam enter through a line 20 and pass through openings in the grid 18 to assist in maintenance of the bed 12 in a fluidized state. The ash contained in the feed coal within the bed 12 generally settles near the bottom of the fluid bed 12 to its greater density. Thus, the ash particles flow down the sides of the generally conical grid 18 and pass into or enter a withdrawal chamber or passage 22 which is formed as part of the grid 18.

The ash particles are contacted within passage 22 by a high velocity air/stream or oxygen/steam stream. The stream enters the chamber or passage by passing from line 28 and through the narrow throat or orifice 26 of the passage or venturi tube 24. The air or oxygen and steam stream entering the throat 26 via an inlet line 28 reacts with coal particles that enter the region of the passage 22.

The localized higher temperatures in the region of passage 22 cause the ash particles within the passage 22 to become sticky. As a consequence, the ash particles, as they strike each other, gradually agglomerate. When they reach a sufficient size and weight, the velocity of air or oxygen and steam stream entering through the venturi 24 is insufficient to keep the agglomerated particles in a fluid or suspended state. As a result, they pass downwardly through the venturi 24 into the withdrawal line 30.

The velocity of the inlet gases through the venturi throat 24 is high compared to the gas velocity at distribution grid 18. This high velocity stream, as mentioned previously, forms a jet or a spout giving rise to a violent and rapid circulation of solids in the zone of the passage 22. The gases passing through the venturi 24 also contain a higher percentage of the oxident than those gases passing through the distribution grid 18. Thereby, as previously explained, a higher temperature is generated in the zone of passage 22 and in the middle, but not entirely through the fluidized bed 12.

As illustrated in FIGS. 2-5, in accordance with the invention, a spiral ridge 32 is positioned on the interior surface of the constricted cylindrical opening 34 of the venturi 24.

The improved venturi apparatus is used to effectuate the withdrawal of ash-rich material from a fluidized bed 12. The venturi 24 has a downward extending conical portion 54, a constricted cylindrical opening 34 and an upward extending conical portion 22 wherein the agglomerated solids are formed by a high temperature reaction between the hydrocarbonaceous material and an upwardly passing gas stream 50. The gas 50 contacts and reacts with the carbonaceous solids in the bottom of the fluidized bed 12 to form particles with a sticky ash material on at least part of the surface. These particles collide to form the agglomerated solids. The agglomerated solids are then withdrawn through the venturi 24 which has means defined on the interior surface of the constricted cylindrical opening 34 for guiding the agglomerated solids in a helical motion through the constricted opening 34 from the top end 36 of the constricted opening 34 to the bottom end 42 of the constricted opening 34. The guiding means comprises descending ridges, preferably at least one spiral ridge 32 positioned on the interior surface of the constricted opening 34 thereby permitting an increased rate of solid discharge from the fluidized bed 12 through the venturi 24 and facilitating improved separation of agglomerated solids from unreacted solid hydrocarbonaceous material.

FIGS. 6 and 7 illustrate an alternative embodiment wherein a set of four spiral ridges 44 is positioned on the interior surface of the constricted cylindrical opening 34 of the venturi 24, each ridge 44 projecting into the venturi cylinder 34 a distance equal to at least the average anticipated diameter of the solid agglomerate. The spiral ridges 44 begin at the top end 36 of the constricted cylindrical opening 34, proceed along the inside surface of the cylindrical opening in a helical fashion and are spaced 90 degrees apart. Each ridge 44 is in a spiral configuration, and a 360 degree revolution of each ridge 44 is accomplished in a height equal to the diameter of the constricted opening 34 of the venturi 24. The ridges 44 terminate at a height above the base or bottom end 42 of the cylindrical portion of the venturi 24 equal to one-fourth the diameter of the venturi 24. Each ridge 44 has a tapered section 46 which tapers to the venturi wall 48 uniformly at the base or bottom end 42 of the cylindrical opening 34.

The set of ridges 44 may be placed in a venturi originally having a smooth central core or the venturi 24 may be fabricated with the ridges 44 in place. The set of spiral ridges 44 is of a width and pitch selected to permit a desired rate of solid agglomerate discharge from the diameter of the venturi 24. The ridges 44 provide a type of chute to permit solids flow through the cylindrical portion 34 of the venturi 24. The lower part 54 of the venturi 24 provides a transition to initiate classification of the solid material. The width of the ridges 44 can be reduced gradually to permit enhanced contact of the solid material with the upflowing gas stream 50 for classification of the solid material. The gas stream 50 may flow directly upward or may have a tangential velocity imparted through the provision of tangential entrance ports 52 below the venturi 24.

The present invention can be better understood with reference to the following example.

EXAMPLE

With reference to FIGS. 4 and 6, venturi 24 having an upper conical section 22 with an upper diameter of 12 inches, a lower diameter of 3 inches and a length, $L_1$, of 15.5 inches, a cylindrical section 34, and a lower inverted conical section 54 was placed at the bottom of a fluidized bed 12 in a reactor 10. Reactor 10 has a diameter of 4 feet and a fluidized bed depth of approximately 24 inches. The cone 22 was connected to a constricted cylindrical opening 34 having a diameter of 3 inches and a length, D, of 9 inches. Below cylindrical section 34 was a conical section 54 having a length $L_2$ of 15.5 inches and a lower diameter of 12 inches and extending downward at an angle of 16° from the vertical.

A cold flow model of venturi 24 was used to simulate the operation of a fluidized bed gasifier. The bed contained a uniform mixture of 400 pounds of acrylic particles and 100 pounds of alumina spheres. The acrylic particles had a density of 72 pounds per cubic foot and an average diameter of 0.02 inches to simulate unburned coal particles. The alumina spheres had a density of 157 pounds per cubic foot and an average diameter of 0.16 inches to simulate ash agglomerates.

When a venturi having a smooth internal surface was utilized, the simulated ash particles discharged from the fluidized bed at a rate of 2.0 pounds per minute when the upward gas velocity in the venturi was 40 feet per second. When a cylindrical section 34 having eight spiral ridges 44, having a width of 0.5 inches and a descent angle of 45°, positioned on the interior surface of the cylindrical section was utilized, the simulated ash particles were discharged at a rate of 3.5 pounds per minute for a venturi velocity of 40 feet per second, as determined by measuring the volumetric flow rate through the venturi and dividing this rate by the venturi cross sectional area less the cross sectional area of the spiral ridges positioned on the interior surface of the venturi. The increase in discharge from 2 pounds per minute to 3.5 pounds per minute obtained through the utilization of the improved venturi apparatus demonstrates the advantages of the apparatus.

It should be understood that the foregoing disclosure emphasizes certain specific embodiments of the invention and that all modifications or alternatives equivalent thereto are within the spirit or scope of the invention as set forth in the appended claims.

I claim as my invention:

1. A process for the conversion of solid hydrocarbonaceous particles to valuable gaseous components in a fluidized bed and withdrawing agglomerated solids from the bottom of the fluidized bed which comprises:
   (a) passing said solid hydrocarbonaceous particles into said fluidized bed;
   (b) contacting said solids with an upward flowing gaseous medium at conditions sufficient to form gaseous fuel components by a gasification reaction between the solids and the gaseous medium;
   (c) passing a high velocity gas stream upward into the bottom of said fluidized bed through a venturi passage having an upwardly extending cone portion and a central constricted opening to contact and react with the solid material in the bottom portion of the fluidized bed at conditions sufficient to form agglomerated solids;
   (d) withdrawing the agglomerated solids through said central constricted opening, said opening having at least one spiral ridge positioned on the interior surface of said constricted opening thereby permitting an increased rate of solid discharge through said passage and facilitating improved separation of agglomerated solids from unreacted solid hydrocarbonaceous material.

2. The process of claim 1 wherein said agglomerated solids are reaction products formed from said solid hydrocarbonaceous particles, said particles being reactants, said reaction products being more dense than said reactants.

3. The process of claim 2 wherein said solid hydrocarbonaceous particles are coal.

4. The process of claim 1 wherein said central constricted opening is cylindrical.

5. The process of claim 1 wherein the width of said at least one spiral ridge is tapered in said venturi thereby permitting improved contacting of the solid material with the upflowing gases for classification of the solid material.

6. The process of claim 5 wherein said at least one spiral ridge comprises at least two equally spaced spiral ridges, each spiral ridge projecting into the venturi cylinder a distance at least equal to the average anticipated diameter of the solid agglomerate.

7. The process of claim 5 wherein said spiral ridges begin at the top of said constricted cylindrical opening and proceed along the inside surface of the cylindrical opening in a helical fashion, spaced about 90 degrees apart.

8. The process of claim 5 wherein said spiral ridges accomplish about a 360 degree revolution in a height substantially equal to the diameter of the constricted opening of the venturi.

9. The process of claim 5 wherein the revolutions of said spiral ridges terminate at a height above the bottom of said venturi equal to about one-fourth the diameter of the venturi and said spiral ridges taper to the wall of the venturi substantially uniformly at the base of said constricted cylindrical opening.

* * * * *